US007366639B2

(12) United States Patent
Doel et al.

(10) Patent No.: US 7,366,639 B2
(45) Date of Patent: Apr. 29, 2008

(54) METHODS FOR ESTABLISHING ALERTS AND/OR ALERT LIMITS FOR MONITORING MECHANICAL DEVICES

(75) Inventors: David Lacey Doel, Maineville, OH (US); Charles Eric Lethander, Cincinnati, OH (US); Heidi Leoti Davidz, Cambridge, MA (US)

(73) Assignee: General Electric Company, Schenectady, NY (US)

( * ) Notice: Subject to any disclaimer, the term of this patent is extended or adjusted under 35 U.S.C. 154(b) by 654 days.

(21) Appl. No.: 10/953,317

(22) Filed: Sep. 29, 2004

(65) Prior Publication Data

US 2006/0085102 A1    Apr. 20, 2006

(51) Int. Cl.
*G06F 19/00* (2006.01)
(52) U.S. Cl. ..................... 702/185; 702/179
(58) Field of Classification Search ........... 702/182, 702/183, 184, 185, 179, 181, 34, 35; 701/4, 701/14
See application file for complete search history.

(56) References Cited

U.S. PATENT DOCUMENTS

| | | | | |
|---|---|---|---|---|
| 5,293,775 | A | * | 3/1994 | Clark et al. .................... 73/116 |
| 5,406,502 | A | * | 4/1995 | Haramaty et al. ........... 702/183 |
| 5,852,793 | A | * | 12/1998 | Board et al. ................. 702/56 |
| 6,216,066 | B1 | | 4/2001 | Goebel et al. |
| 6,408,259 | B1 | | 6/2002 | Goebel et al. |
| 6,681,194 | B2 | | 1/2004 | Doel et al. |
| 6,687,596 | B2 | | 2/2004 | Humerickhouse et al. |

OTHER PUBLICATIONS

Satnam Alag, Alaice M. Agogino, Mahesh Morjaria, Methodology for Intelligent Sensor Measurement, Validation, Fusion, and Fault Detection for Equipment Monitoring and Diagnostics, University of California, Berkeley, pp. 1-41.
Petter Haroldsson, Optimism of a Diagnostic Test for a Truck Engine, Mater's Thesis performed in Vehicular Systems, Sep. 9, 2002, pp. 1-59, Linkoeings Universitet, Linkoeing, Sweden.
Roy A. Maxion, Kymie M.C. Tan, AnomalyDetection in Embedded Systems, IEEE Trans. on Computer, Jan. 2002, preprint dated Oct. 2001, pp. 1-34.
O. Rong, J. Shi, D. Ceglarek, Adjusted Least Squares Approach for Diagnosis of Ill-Conditioned Compliant Assemblies, Journal of Manufacturing Science and Engineering, Aug. 2002, vol. 123, pp. 453-461.
R.A. Nayak, Urban Vehicular Multipath Detection Using Multiple Antennas and Reliability Analysis, ION GPS 2000. Salt Lake City, UT, Sep. 19-22, 2000, pp. 1-10.

* cited by examiner

*Primary Examiner*—Bryan Bui
(74) *Attorney, Agent, or Firm*—William Scott Andes, Esq; Armstrong Teasdale LLP

(57) ABSTRACT

A method for establishing an alert or an alert limit for monitoring a mechanical device includes identifying faults that can be recognized by their effect on measured trends and determining a set of available sensors for monitoring the trends. Representative data are acquired and processed to obtain a statistical characterization of the trends. In addition, a parameter variance is determined for at least one alert test in accordance with the statistical characterization. The method further includes analyzing Type I and Type II error risks and associated financial penalties to adjust parameters associated with the alert test and programming an automated alert system to utilize the adjusted parameters to identify measured trends of a mechanical device that are to be brought to the attention of a human analyst.

21 Claims, 1 Drawing Sheet

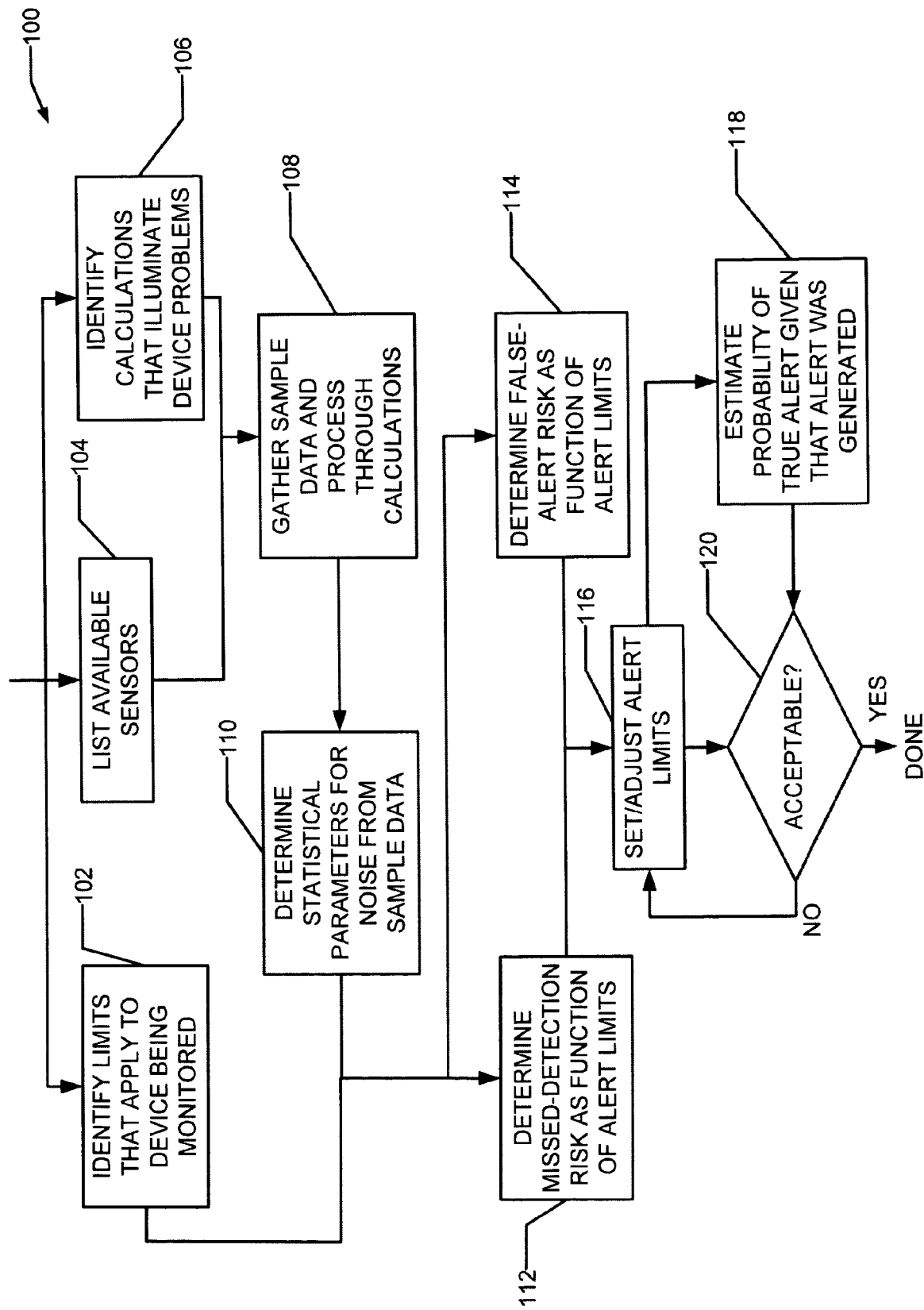

METHODS FOR ESTABLISHING ALERTS AND/OR ALERT LIMITS FOR MONITORING MECHANICAL DEVICES

BACKGROUND OF THE INVENTION

This invention relates generally to methods for establishing criteria to automatically recognize hardware performance problems. Various configurations of the present invention are useful for monitoring mechanical devices, including, but not limited to, aircraft engines.

Most complex mechanical devices include sensors at discrete points within the device that provide data to allow confirmation of normal performance and/or recognition of aberrant behavior signaling a need for maintenance. For example, a car may include an odometer, temperature gage, battery gage, and other sensors that can be used to recognize impending failures. (A battery gage, for example, can indicate a failure of an alternator.) One known practice is to generate trends of sensed measurements and to use these trends to recognize the beginning stage of a problem. For example, one can compute a gas mileage obtained for a car at each fill-up and watch the trend of this mileage over time. Generally speaking, problems can be suggested when a variable (for example, gas usage per unit mileage) exceeds an identified usage, whenever the same variable begins to trend towards a predefined limit, or whenever the same variable shows a sudden, sustained shift in value.

Reviewing these trends for a single device, such as a car, is not particularly labor-intensive and thus can be done manually. However, monitoring hundreds or thousands of machines (such as a fleet of aircraft or all networked computers in a medium to large company) can be very labor-intensive and error-prone. It is difficult for an analyst to review hundreds of device trends, day after day, and the analyst's concentration may be lost at various times during a review. It has been reported, for example, that such problems sometimes occur in hospitals, where employees spend long hours reviewing x-rays to detect medical problems such as breast cancer.

Another difficulty that sometimes arises is measurement noise that results from inaccurate sensors, varying environmental conditions, sensing at irregular intervals, etc. Such problems are well-known to anyone who has monitored the gas mileage of his or her own car, especially when data is used from partial tank fill-ups.

In some known methods for analyzing trends, a computer is used to monitor a large amount of equipment. The computer is used to perform calculations, generate plots of parameter trends, and determine whether any parameters have exceeded predetermined or otherwise specified limits. Smoothing, such as exponential smoothing or the use of running averages, is sometimes used to reduce variations in data that result from sensor noise. In some cases, computer programs are provided and used to identify trends that should be reviewed by a human analyst. Tests used by these programs may include comparing raw trended values to upper and lower limits, comparing a smoothed value to (possibly different) limits established for the smoothed traces, and comparing a difference between a current raw trended value and a prior smoothed value to a "shift limit" to thereby recognize sudden changes in performance. The programs may require that a trend shift be repeated by two or more readings before being enunciated to reduce the probability of false alarms resulting from sensor noise. An enunciation of a potential problem is often referred to as an "alert." Alerts are used to highlight trends that should be used by a human analyst to check for equipment malfunctions. The use of alerts can reduce the need for routine manual review of many trends that do not exhibit anomalous behavior.

Alerts limits must be carefully selected in some applications. For example, if alert limits are set too loosely, faults that might otherwise have been detected by trend analysis may go undetected. On the other hand, alerts that are set too tightly may result in a loss of productivity and increase the probability that problems may go undetected due to loss of concentration on the part of a human analyst.

Some alerts are associated with so-called "hard limits," i.e., bounds that must not be breached. For example, a device being monitored may have an absolute operation temperature limit. In this case, if a sensor value exceeds the temperature limit, it is obvious that an alert must be triggered. However, beyond this application of common sense, trial and error has been used for the selection of limits used for enunciating alerts.

BRIEF DESCRIPTION OF THE INVENTION

In some aspects, the present invention therefore provides a method for establishing an alert or an alert limit for monitoring a mechanical device. The method includes identifying faults that can be recognized by their effect on measured trends and determining a set of available sensors for monitoring the trends. Representative data are acquired and processed to obtain a statistical characterization of the trends. In addition, a parameter variance is determined for at least one alert test in accordance with the statistical characterization. The method further includes analyzing Type I and Type II error risks and associated financial penalties to adjust parameters associated with the alert test and programming an automated alert system to utilize the adjusted parameters to identify measured trends of a mechanical device that are to be brought to the attention of a human analyst.

Configurations of the present invention will thus be seen to reduce risks associated with human error in spotting deviations from normal performance of mechanical devices.

BRIEF DESCRIPTION OF THE DRAWINGS

The FIGURE is a flow chart representative of various configurations of the present invention.

DETAILED DESCRIPTION OF THE INVENTION

In some configurations of the present invention, absolute limits of a mechanical device that should be observed are identified as are available sensors to establish the condition of the device relative to these identified absolute limits. Technical effects of the present invention include generation of limits that are programmed into automated data processing equipment that is used for detecting trends of a mechanical device that indicate the need for maintenance and/or other attention. A relationship between sensor data and device limits can be determined using calculation routines developed and proven through standard software development and testing techniques.

Desired types of alarms are identified. Previous experience with similar devices can be used to suggest types of alerts that may be required in a particular application. These alerts can include absolute limits on raw measurements and/or computed values, limits on smoothed values, limits on step changes, or other types of limit tests.

In some configurations of the present invention, a statistical characterization of the data being acquired from the device is developed. This analysis includes, for example, end-to-end data acquisition and processing for as many independent devices as practical to ensure that all error sources have been determined. To facilitate generation of appropriate alerts, the statistical behavior of tests being performed can be analyzed using various analytical or Monte Carlo techniques to characterize the process. This characterization is used as an input to an analysis that estimates the likelihood of false alerts (type I risk) and the likelihood of missed alerts (type II risk). Various parameters available to the alert test including limits, persistence, etc., can be varied to tune the alert tests. Other factors, such as frequency of data availability, may be factored into the analysis to define tests and associated type I and type II risks. These factors are used to establish the preliminary alert limits.

Once the initial alert limits have been established, the probability of false alerts (type I risk) is again evaluated to determine whether the ratio of false alerts to true alerts is so high that it would hinder achievement of productivity and reliability goals. If the ratio is too high, the resulting desensitization poses a risk of missed alerts that is harder to quantify. A considered judgment is made at the end to balance risks causing missed alerts with the productivity cost associated with false alerts. One advantage provided by some configurations of the present invention is that this judgment is based on the best available data.

In some configurations of the present invention, a process is applied to the monitoring of gas turbine engines. More particularly and referring to flow chart 100 of the Figure, in some configurations of the present invention, a technical effect of the present invention is achieved by a user of the invention first analyzing available engine and aircraft manuals at 102 to determine a list of engine faults that can be recognized by their impact on measured trends. In some configurations, prior experience with engine faults can be used to augment this list. Also, in some configurations, the analysis identifies specific types of tests to be performed. These tests may include, by way of example and without limitation, comparison of a value to an absolute limit, or recognition of a parameter shift greater than a fixed limit.

Available sensors for engines being monitored are determined at 104, as are flight conditions under which data will be available.

In various configurations, calculations needed to place data on a consistent footing are determined at 106. As used herein, data is on a "consistent footing" when it is adjusted to a reference condition. For example, in configurations suitable for gas turbine engines, adjusting data to a consistent footing refers to adjusting the data to a reference flight condition (which may include, without limitation, one or more of a reference altitude, Mach number, total air temperature, or bleed configuration) and power setting. In some configurations, calculations are also used to compute engine quality measures that are not directly measured (e.g., efficiency).

Sample data is then acquired at 108 to monitor the engine family. In some configurations, this data is obtained and processed using the same techniques used for regular monitoring, thereby generating the same trends that will be tested for alerts. Also in some configurations, a sample of engines is selected for the engine family that includes as many different engines and flight conditions as practical. The selection is chosen to be large enough to provide a reliable statistical characterization.

From the acquired data, a parameter variance is determined for each alert test at 110. For example, if a shift alert is proposed for exhaust gas temperature (EGT) derivation from baseline at cruise, the variance of the calculated EGT deviation is calculated. The variance is calculated in some configurations for each individual engine and combined into a pooled value for a fleet.

Next, curves and/or tables are developed that predict Type I and Type II risks (also referred to as Type I and Type II errors at 112 and 114, respectively, wherein Type I refers to a missed alert and Type II refers to a false alert) associated with alerting. These curves and/or tables in some configurations indicate the effect of various parameters associated with the alert and may include, without limitation, alert limit, smoothing coefficient, required persistence, etc. Some configurations generate data for the curves and/or tables analytically or using Monte Carlo techniques.

In some configurations, financial penalties associated with Type I and Type II risks are estimated or determined. Using these penalties and the curves and/or tables, values for various parameters associated with alert tests (for example and without limitation, persistence, smoothing, and/or alert limit) are selected. Because gas turbine engines are expensive, many configurations of the present invention reduce the risk of missing an alert to as low a value as is practical. False alerts are sometimes seen as affecting only productivity, so they are considered to be less critical in many configurations of the present invention.

Once alert parameters are selected at 116, some configurations of the present invention perform an additional analysis at 118 to estimate a human element of the missed detection risk. More specifically, an analysis is performed to determine the probability that an alert signals a true engine fault. This analysis is performed using reasonable assumptions about the frequency of occurrence of engine faults. If the probability of a true fault is extremely low, it may be assumed that true faults are likely to be missed because users will learn to ignore the alerts. As a rule of thumb, at least about 10% of alerts should be associated with trends that cannot be distinguished from those associated with true faults without further troubleshooting. The additional analysis to estimate the human element of the missed detection risk is performed using Monte Carlo methods in some configurations. Its results, which, in some configurations is presented as a function of the alert limit, are used to determine whether the alert limits selected are acceptable at 120, and if not, the analysis is used to iteratively adjust the alert limits at 116.

It will thus be appreciated that configurations of the present invention are useful in determining parameters for automatic fault detection systems and in reducing human error inherent in recognizing faults needing maintenance.

While the invention has been described in terms of various specific embodiments, those skilled in the art will recognize that the invention can be practiced with modification within the spirit and scope of the claims.

What is claimed is:

1. A method for establishing at least one of an alert or an alert limit for monitoring a mechanical device, said method comprising:
    identifying faults that can be recognized by their effect on measured trends;
    determining a set of available sensors for monitoring said trends;
    acquiring and processing representative data to obtain a statistical characterization of said trends;

determining a parameter variance for at least one alert test in accordance with said statistical characterization;

analyzing Type I and Type II error risks and associated financial penalties to adjust parameters associated with the at least one alert test, wherein one Type I error risks represent the likelihood of false alerts, and wherein the Type II error risks represent the likelihood of missed alerts;

automatically programming an automated alert system to utilize the adjusted parameters to identify measured trends of a mechanical device that are to be brought to the attention of a human analyst.

2. A method in accordance with claim 1 further comprising identifying a test to be performed by the automated alert system that includes comparison of a monitored trend value to an absolute limit.

3. A method in accordance with claim 1 further comprising identifying a test to be performed by the automated alert system that includes recognition of a monitored trend value shift greater than a fixed limit.

4. A method in accordance with claim 1 wherein said processing of representative data comprises adjusting the data to a reference condition.

5. A method in accordance with claim 1 wherein said processing of representative data comprises computing an efficiency measure.

6. A method in accordance with claim 1 further comprising analyzing the alert parameters to determine a probability that an alert signals a true fault and adjusting alert limits in accordance to increase the probability that an alert signals a true fault.

7. A method for establishing at least one of an alert or an alert limit for monitoring a mechanical device, wherein the mechanical device is an aircraft engine, and said method comprises:

reviewing one or more manuals from the set consisting of engine manuals and aircraft manuals to identify faults that can be recognized by their effect on measured trends;

determining a set of available sensors for monitoring said trends;

acquiring and processing representative data to obtain a statistical characterization of said trends;

determining a parameter variance for at least one alert test in accordance with said statistical characterization;

analyzing Type I and Type II error risks and associated financial penalties to adjust parameters associated with the at least one alert test, wherein the Type I error risks represent the likelihood of false alerts and wherein the Type II error risks represent the likelihood of missed alerts;

automatically programming the automated alert system to utilize the adjusted parameters to identify measured trends of a mechanical device that are to be brought to the attention of a human analyst.

8. A method in accordance with claim 7 wherein said determining a set of available sensors for monitoring said trends further comprises determining flight conditions under which said monitored trends are to be available.

9. A method in accordance with claim 7 further comprising identifying a test to be performed by the automated alert system that includes comparison of a monitored trend value to an absolute limit.

10. A method in accordance with claim 7 further comprising identifying a test to be performed by the automated alert system that includes recognition of a monitored trend value shift greater than a fixed limit.

11. A method in accordance with claim 7 wherein said processing of representative data comprises adjusting the data to a reference condition.

12. A method in accordance with claim 11 wherein the reference condition is a reference flight condition.

13. A method in accordance with claim 12 wherein the reference flight condition includes a predetermined condition selected from the group consisting of altitude, Mach number, total air temperature, and bleed configuration.

14. A method in accordance with claim 11 wherein the reference condition further comprises a power setting.

15. A method in accordance with claim 7 wherein said processing of representative data comprises computing an efficiency measure.

16. A method in accordance with claim 7 wherein said acquiring and processing representative data to obtain a statistical characterization of said trends further comprises generating trends to be tested for alerts.

17. A method in accordance with claim 16 performed using a plurality of different engines and flight conditions.

18. A method in accordance with claim 17 wherein said parameter variance comprises a EGT deviation from baseline at cruise.

19. A method in accordance with claim 18 wherein said EGT deviation from baseline at cruise is determined for each said engine and combined into a fleet pooled value.

20. A method in accordance with claim 7 further comprising analyzing the alert parameters to determine a probability that an alert signals a true fault and adjusting alert limits in accordance to increase the probability that an alert signals a true fault.

21. A method in accordance with claim 20 wherein said analyzing the alert parameters comprises a Monte Carlo simulation.

* * * * *